July 9, 1935.  F. R. KAIMER  2,007,762
ELECTRICAL CABLE
Original Filed June 16, 1930
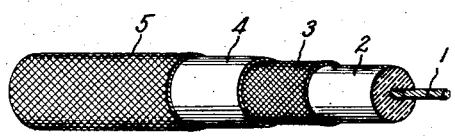
Inventor:
Fred R. Kaimer,
by Harry E. Dunham
His Attorney.

Patented July 9, 1935

2,007,762

UNITED STATES PATENT OFFICE 2,007,762

ELECTRICAL CABLE

Fred R. Kaimer, York, Pa., assignor to General Electric Company, a corporation of New York Original application June 16, 1930, Serial No. 461,304. Divided and this application July 13, 1933, Serial No. 680,265

9 Claims. (Cl. 106—13)

The present application is a division of my copending application Serial No. 461,304, filed June 16, 1930.

The present invention relates to electrical cables and is more particularly concerned with rubber insulated electrical cables especially adapted for use in relatively high voltage circuits such for example as cables adapted to be used in connection with display signs illuminated by means of tubes containing rare gases, such as neon and the like.

One of the serious difficulties confronting the use of rubber insulated electrical cables in high voltage circuits and the primary reason why rubber has not been employed as the insulation material in high tension cables is because of the fact that such cables fail in a comparatively short time due to the deterioration and destruction of the insulation. This is primarily due to the fact that during operation in high voltage circuits ozone is always generated due to corona discharge. The ozone so formed is a powerful oxidizing agent which violently attacks and destroys the insulation. While it is recognized that rubber is a desirable material for cables operating at high voltages because it has the requisite dielectric properties and flexibility, it has heretofore not been useful as an insulation material in this connection because it is ordinarily unable to withstand this ozone attack and fails after a relatively short period in use.

It has hence been a decided problem to obtain a properly insulated cable in which the insulation will have the requisite dielectric strength and flexibility and at the same time be ozone resistant. I have discovered that I can produce an insulated cable which has the requisite dielectric strength and flexibility and is so constructed that it may be used in high voltage circuits without deterioration or attack due to ozone formed as a result of corona discharge, and which is so designed that it is economical and simple to manufacture.

In order that my invention may be more fully understood reference is made to the detailed description thereof given below and the accompanying drawing forming part of this application, and to the appended claims which point out its scope.

In the drawing the figure is a diagrammatic perspective view of a cable in accordance with the present invention.

As illustrating my invention, the cable shown in the drawing is of the single conductor type and is a flexible cable which may be used for example in connection with neon gas signs. Operating characteristics of such signs require the use of voltages ranging from 5 to 15 k. v., and under extreme conditions the voltage may rise to 25 k. v. Under such conditions the cable must be provided with insulation having the requisite dielectric strength and so constructed that it is resistant to ozone attack due to corona discharge. The cable of the present invention is particularly adapted for this purpose.

The cable illustrated comprises a single conductor 1 which is preferably tinned copper and stranded. This conductor is insulated with a covering 2 of high dielectric strength but which is, however, ordinarily subject to ozone attack, as for example a high grade rubber compound of suitable wall thickness. Over this covering 2 is a braid 3 of soft cotton yarn. On the covering and braid is a sheath or wall 4 of special ozone-resistant material to be more fully described hereafter. A cotton braid 5 is applied over the protective sheath 4, and this is impregnated with standard flame-proofing and weather-proofing compounds.

The process of manufacture of the cable is as follows:

A plurality of layers, usually four, of high grade rubber are applied in tandem to the conductor by means of a strip covering machine. Over this is applied, prior to vulcanizing, a reinforcing braid of fibrous material such as white soft cotton. The function of the inter-braid is two-fold. First, it permits the successful application of the protective sheath of specially ozone-resistant compound by the extrusion or tubing method. Without it, tubing over the covering would be practically impossible. Second, it exercises a reinforcing function. It prevents the cracking and splitting of the rubber. Without it, the rubber would be too soft and swell during the vulcanizing process. The interbraid could be omitted without detriment to the cable if the sheath of ozone-resistant material were applied by the strip covering method. It is, however, easier and more economical to use the extrusion method.

The specially ozone-resistant material, properly plasticized to permit rapid application thereof, is now extruded over this braided rubber covering. The rubber covering protected by the latter sheath is now vulcanized in the usual manner in direct steam vulcanizers, employing a special cure as follows:

A gradual warming to about 260° F. for approximately ½ hour.

A cure at about 260° F. for approximately 1½ hours.

Another rise from about 260° F. to about 275° F. for approximately ½ hour.

A cure at about 275° F. for approximately 1½ hours.

During this period the inner covering of high grade rubber becomes very tough and resilient and effects a complete union with the outer protective sheath. The sheath, however, remains practically unaffected in its physical properties by this heating, which is very desirable. The reason for extending the cure over a period involving a gradual rise in temperature from about 260° F. to about 275° F. is to insure a dense, non-porous wall in the protective sheath of ozone-resistant material. A constant temperature cure at either of the above temperatures will produce a porous condition in the sheath.

After the ozone-resistant sheath has been applied the outer covering of cotton braid is applied thereto and this is impregnated in a manner well-known in the art with standard weather-proofing and flame-proofing compounds.

In order to prepare the ozone-resistant compound used in connection with the manufacture of the cable the following procedure is employed:

A special vulcanized pitch, which is the active ozone resisting ingredient, is first prepared by mixing a vegetable pitch, such for example as palm oil pitch, cottonseed pitch and the like; a semi-drying oil such as rapeseed oil, castor oil, and the like; a vulcanizing agent such as sulphur together with magnesia, or an accelerator having similar properties, heating gradually to form a viscous liquid mass, the final temperature reaching the neighborhood of 300–350° F. While the proportions of the ingredients used may vary, I prefer to use a mixture of approximately the following composition:

|  | Parts |
|---|---|
| Palm oil pitch | 50 |
| Rapeseed oil | 50 |
| Sulphur | 5 |

During the heating period a combination with the sulphur takes place which is perhaps similar to rubber vulcanization. To control the melting point and penetration of the resultant product the heating period may vary from 3 to 7 hours. I prefer to use a product which is formed by heating the above mixture over a period of about 6 hours at 300° F. After heating, the mass is allowed to cool and set to a rubber-like material. In this state it is ready for combination with the other ingredients used in making up the ozone-resistant compound.

The special vulcanized pitch is combined with suitable proportions of crude rubber, reclaimed rubber, filler and sulphur following standard rubber compounding practice. The filler used may include such standard fillers as zinc oxide, clay, ozokerite and usual accelerators and softeners. The constituents employed in the preparation of the special ozone-resistant compound may be varied within the approximate limits, as follows:

|  | Percent by weight |
|---|---|
| Crude rubber up to | 10 |
| Reclaimed rubber | 10 to 25 |
| Special vulcanized pitch | 40 to 80 |
| Filler up to | 10 |
| Sulphur up to | 0.5 |

The vulcanized pitch employed in the ozone resistant compound combines several functions. It is nonoxidizable and not affected by the ozone formed at high voltages. When used in the percentages indicated, in the ozone resistant compound, it is the material which imparts resistance to ozone due to corona attack. Again, its use gives a compound having a very low modulus, that is, high percentage elongation and low percentage set,—a very desirable physical property for obtaining maximum ozone resistance. It retains practically the same physical properties before and after cure. Since it is vulcanized together with the inner rubber covering for economy of manufacture, this is a very desirable feature.

The present construction of cable has the following advantages: It is simple and economical to manufacture. The use of the high grade rubber covering gives the cable high dielectric strength and the superposed sheath of ozone-resistant material imparts protection to the rubber against ozone attack due to corona discharge, and against natural aging. The use of a separate sheath of the corona-resistant material is necessary in the construction, inasmuch as it would not be practical to make the inner covering of this material. If used for the inner covering the dielectric strength would be insufficient.

It is to be understood that my invention is capable of various modifications by those skilled in the art to which it pertains and I do not wish to be limited except by the scope of the appended claims. For example, it is within the scope of the present invention to so construct the cable that a plurality of sheaths of ozone-resistant material are present therein. It is possible, for instance, to provide two separate layers of the ozone-resistant compound, one as shown in the drawing and another directly over the surface of the stranded wire and between the wire and the rubber covering to resist any action on the rubber by ozone due to corona discharge which might occur at high operating voltages due to air entrapped between the strands of wire. Also, while I have illustrated my invention as applied to a high tension cable employing rubber as the inner covering for the conductor it is to be understood that it is entirely within the scope of my invention to employ a material other than rubber for such covering, the material having the desired properties of the rubber, namely, requisite dielectric strength and flexibility, but which is, however, subject to ozone attack due to corona discharge, using a protective sheath therefor as described and claimed herein.

What I claim as new and desire to secure by Letters Patent of the United States, is:

1. An ozone-resistant composition comprising the combination of palm oil pitch, rapeseed oil and sulphur heat-treated at about 300° F.

2. An ozone-resistant composition comprising the combination of about equal parts by weight of vegetable pitch and semi-drying oil and a relatively minor proportion of vulcanizing agent, heat-treated at about 300° F.

3. An ozone-resistant composition comprising the combination of about 50 parts by weight of palm oil pitch, about 50 parts by weight of rapeseed oil and about 5 parts by weight of sulphur, heat-treated at about 300° F. for about six hours.

4. A composition adapted for use in an ozone-resistant material for electrical cables adapted to operate at high voltages, which comprises the combination in suitable proportions of vegetable pitch, semi-drying oil, vulcanizing agent and accelerator.

5. A composition adapted for use as an ozone-resistant material for electrical cables adapted to operate at high voltages, which comprises the combination in suitable proportions of rubber, filler, sulphur, and ozone-resistant vulcanized pitch, said latter ingredient being the combination of about equal parts by weight of vegetable pitch and semi-drying oil and a small proportion by weight of vulcanizing agent.

6. The method of making a composition adapted for use in an ozone-resistant material for electrical cables adapted to operate at high voltages, which comprises mixing suitable proportions of vegetable pitch, semi-drying oil, vulcanizing agent and accelerator, and heating the mixture gradually to form a viscous liquid mass to a temperature of about 300°–350° F. over a period of about three to seven hours.

7. The method of making a composition adapted for use in an ozone-resistant material for electrical cables adapted to operate at high voltages, which comprises mixing about 50 parts by weight of palm oil pitch with about 50 parts by weight of rapeseed oil and about 5 parts by weight of sulphur, heating the mixture gradually to about 300° F. and holding at this temperature for a period of about six hours.

8. The method of making a composition adapted for use as an ozone-resistant material in electrical cables operating at high voltages, which comprises mixing about 50 parts by weight of palm oil pitch with about 50 parts by weight of rapeseed oil and about 5 parts by weight of sulphur, heating the mixture gradually to about 300° F. and holding at this temperature for a period of about six hours, compounding the product so obtained with a mixture in suitable proportions comprising crude rubber, reclaimed rubber, sulphur and fillers.

9. A composition adapted for use as an ozone-resistant material for electrical cables adapted to operate at high voltages, which comprises the combination of rubber, filler, sulphur and ozone-resistant vulcanized pitch within the approximate limits:

| | Per cent by weight |
|---|---|
| Crude rubber | up to 10 |
| Reclaimed rubber | 10 to 25 |
| Vulcanized pitch | 40 to 80 |
| Filler | up to 10 |
| Sulphur | up to 0.5 | said vulcanized pitch being the combination of about equal parts by weight of vegetable pitch and semi-drying oil and a relatively minor proportion by weight of vulcanizing agent.

FRED R. KAIMER.